United States Patent [19]

Sato

[11] 4,349,853

[45] Sep. 14, 1982

[54] STRONG MAGNETIC FIELD GENERATOR AND METHOD OF OPERATING THE SAME

[75] Inventor: Yoshihisa Sato, Yokohama, Japan

[73] Assignee: Tokyo Shibaura Denki Kabushiki Kaisha, Kawasaki, Japan

[21] Appl. No.: 119,622

[22] Filed: Feb. 7, 1980

[30] Foreign Application Priority Data

Feb. 13, 1979 [JP] Japan ................................ 54-14206

[51] Int. Cl.³ .......................................... H02H 7/00
[52] U.S. Cl. .................................................. 361/19
[58] Field of Search ........................................ 361/19

[56] References Cited

U.S. PATENT DOCUMENTS 3,304,466 2/1967 Minnich et al. ...................... 361/19

OTHER PUBLICATIONS

IEEE Transactions Magnetics, vol. MAG-15, No. 1, Jan. 1979, pp. 670-672, 855-859, 860-863.

"Aspects of Safety and Reliability for Fusion Magnet Systems"-Powell et al., Brookhaven Nat. Lab., 1/76.
"Superconductive Handbook"-Denki-Gakkai The Institute of Electronic Engineers of Japan.

Primary Examiner—Harry E. Moose, Jr.
Attorney, Agent, or Firm—Oblon, Fisher, Spivak, McClelland & Maier

[57] ABSTRACT

A strong magnetic field generator, which comprises a vacuum vessel and a plurality of superconductive coils wound on the outer periphery of the vacuum vessel. It also comprises a plurality of protective coils wound on the vacuum vessel and a control means functioning, upon occurrence of quenching in at least one of the superconductive coils, to reduce current in the superconductive coil with quenching therein for removing the quenching while at the same time causing current corresponding to the reduction of current in the superconductive coil with quenching therein to flow through the protective coils.

5 Claims, 8 Drawing Figures

STRONG MAGNETIC FIELD GENERATOR AND METHOD OF OPERATING THE SAME

BACKGROUND OF THE INVENTION

This invention relates to a strong magnetic field generator using protective coils together with superconductive coils.

Recently, in apparatus requiring strong magnetic fields such as nuclear fusion apparatus and particle accelerators superconductive coils are used in the strong magnetic field generator.

FIG. 1 shows an example of the strong magnetic field generator used for a nuclear fusion apparatus. An annular or torus vacuum vessel 1, in which plasma is trapped, is provided with eight superconductive coils 2 to 9 wound at a uniform interval on its outer torus surface. The superconductive coil 2 is connected to a power source circuit 10 and energized therefrom. The other coils 3 to 9 are also connected to the power source circuit 10 to be energized thereby, but the connection involved is not shown here.

The power source circuit 10 has a construction, for instance, as shown in FIG. 2. Reference numeral 11 designates a power supply which is a combination of an AC power source and a thyristor rectifier. DC current from the power supply 11 is supplied through a DC circuit breaker 12 to the superconductive coils 2 to 9. The superconductive coils 2 to 9 are connected in parallel with a discharge resistor 13. They are each formed by winding a superconductor 15 as shown in FIG. 3, consisting of a central superconductive wire 16 and an outer conductor 17 surrounding the central superconductive wire 16, into the form of a coil. In the superconduction state, current flows through the superconductive wire 16, but when ordinary conduction of the superconductive wire 16 is brought about some of the current gets out from the superconductive wire 16 and flows through the outer conductor 17. The superconductive coils 2 to 9 are held in a cooling medium (not shown) and cooled thereby.

There is a certain maximum current or threshold current that can be caused to flow through the superconductive wire 16, and this threshold current is a function of the temperature of the superconductive wire 16 and external magnetic field. Thus, when ordinary conduction of part of the superconductive wire 16 is brought about due to such cause as a temperature rise or a change of the magnetic field, some of the current that has previously been flowing through the superconductive wire 16 migrates therefrom into the outer conductor 17. This phenomenon is called quenching. The occurrence of quenching in the superconductive coils 2 to 9 leads to a grave accident in the nuclear fusion apparatus that may be caused by Joule heat generated in the outer conductor 17, thermal expansion or evaporation of cooling medium, rupture or burning of the superconductive coils 2 to 9 or other causes unless appropriate protection is provided.

A prior art protection system which is adopted for providing protection in case of occurrence of quenching in a superconductive coil uses a discharge resistor 13 as shown in FIG. 2. With this system, upon occurrence of quenching in one of the superconductive coils 2 to 9, for instance in coil 2, the DC circuit breaker 12 is immediately opened to disconnect the power supply 11 and coil 2 from each other and cause the remaining electric energy or current in the coil 2 to be discharged through the resistor 13, thus removing the quenching of the coil 2. This prior art protective system is very simple and economical in case if the strong magnetic field generator comprises only a single superconductive coil. However, when it is used for an apparatus comprising a number of superconductive coils as shown in FIG. 1, it presents the following various problems.

(1) In case when quenching is brought about in, for instance, the superconductive coil 2 in the system of FIG. 1 and removed by quickly reducing the current in the superconductive coil 2 with the protection system shown in FIG. 2, the currents in the other superconductive coils 3 to 9 are quickly increased due to the law of constant magnetic flux, that is, with mutual induction among the superconductive coils and sometimes exceed the threshold value. In other words, quenching produced in one of the superconductive coils is propagated progressively to the other coils, thus leading to a danger of a fault of the whole system.

(2) When quenching results in one of the superconductive coils in a system having a number of superconductive coils as shown in FIG. 1 and the current in the coil with quenching therein is reduced, an unbalance of the magnetic field is produced to exert forces tending to turn down the system to the superconductive coils. Therefore, grave rupture of the apparatus is liable unless the individual superconductive coils are supported with very great mechanical forces.

(3) When quenching occurs in one of the superconductive coils and is removed by reducing current in the coil with quenching therein, an unbalance of the magnetic field is produced, which is very inconvenient from the standpoint of trapping plasma.

SUMMARY OF THE INVENTION

This invention is intended in the light of the above aspects, and its object is to provide a simple and inexpensive strong magnetic field generator, which ensures its safety and can minimize adverse effects upon plasma when quenching occurs in one of a plurality of its superconductive coils, and a method of operating the same.

According to the invention, the object thereof is achieved by a strong magnetic field generator, which comprises a vacuum vessel, a plurality of superconductive coils wound on the vacuum vessel, a plurality of protective coils wound on the vacuum vessel similar to the superconductive coils, and a control means functioning, at the time of occurrence of quenching in at least one of the superconductive coils, to quickly reduce current in the faulty superconductive coil or coils so as to remove quenching while at the same time cause current corresponding to the reduction of current through superconductive coil with quenching therein to flow through the protective coils.

DESCRIPTION OF THE PREFERRED EMBODIMENTS

Figure 1:
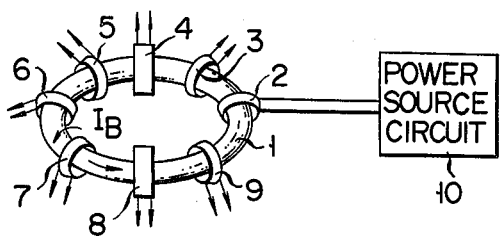
FIG. 1 is a schematic view showing a conventional strong magnetic field generator.
Figure 2:
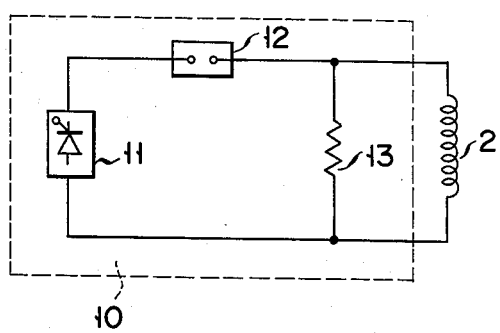
FIG. 2 is a circuit diagram showing an excitation power source circuit in the strong magnetic field generator of FIG. 1.
Figure 3:
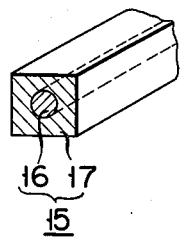
FIG. 3 is a fragmentary perspective view showing a usual superconductive coil conductor.
Figure 4:
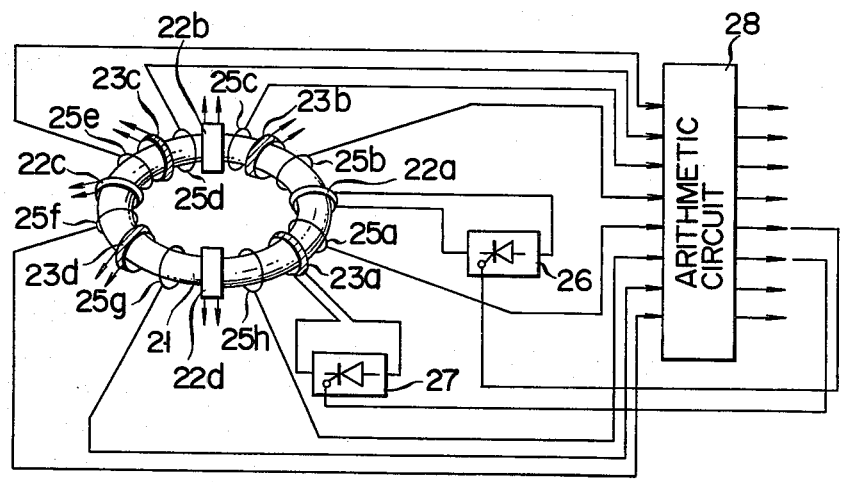
FIG. 4 is a schematic representation of one embodiment of the strong magnetic field generator according to the invention.

Now, some preferred embodiments of the invention will be described with reference to the accompanying drawings. Referring now to FIG. 4, a torus-shaped vacuum vessel 21 is provided with four uniformly spaced superconductive coils 22a, 22b, 22c and 22d wound on its outer surface, and four protective coils 23a, 23b, 23c and 23d are also wound on the outer periphery at positions substantially midway between adjacent superconductive coils. Further, eight magnetic field detectors 25a to 25h are provided between adjacent superconductive and protective coils 22a to 22d and 23a to 23d. It is not essential to provide the magnetic field detectors 25a to 25h between adjacent coils and the number thereof may be suitably reduced. The individual coils are connected to respective thyristor converters. In FIG. 4, only thyristor converters 26 and 27 connected to the superconductive coil 22a and protection coil 23a respectively are shown for the sake of simplicity of the drawing. These thyristor converters 26 and 27 are actually connected to an exciting power source circuit so that the coils 22a and 23a are excited through these thyristor converters 26 and 27. The magnetic field detectors 25a to 25h detect the intensity of the magnetic field in respective portions of the vacuum vessel 21, and their detection outputs are supplied to an arithmetic circuit 28. The arithmetic circuit 28 functions to supply gate control signals to the thyristor gates of the thyristor converters 26 and 27 such as to balance the detected magnetic field intensities. The construction and operation of the arithmetic circuit 28 will now be described in detail with reference to FIGS. 5 and 6.

Figure 5:
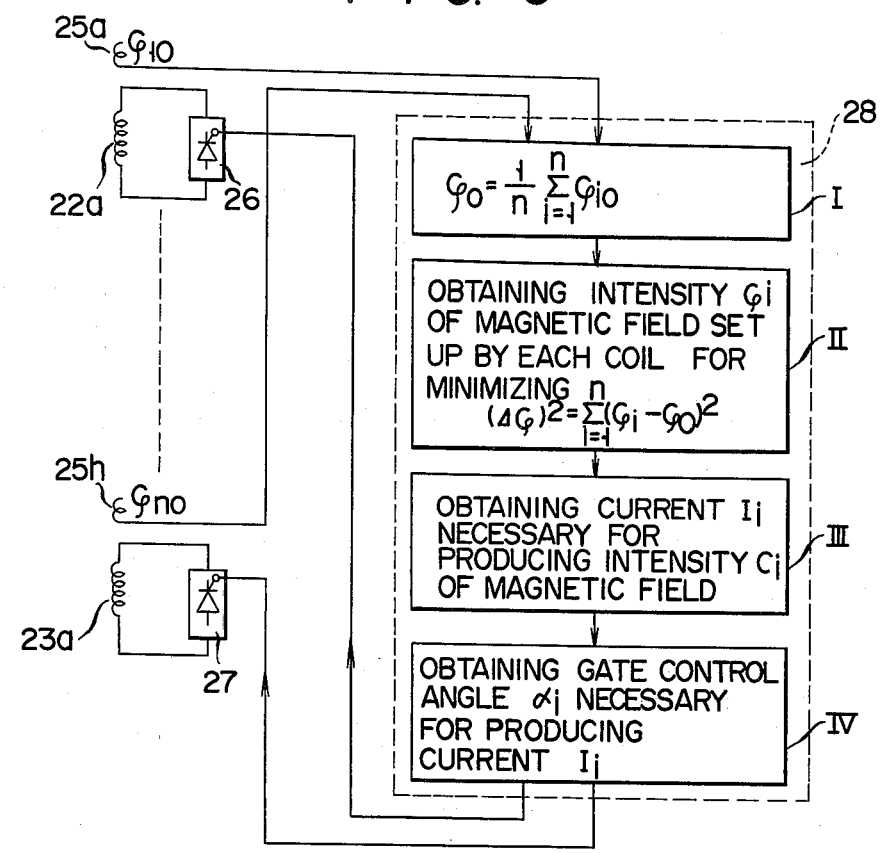
FIG. 5 is a flow chart for illustrating the construction and operation of an arithmetic circuit in the embodiment of FIG. 4.

Referring now to FIG. 5, the outputs $\phi_{10}$ to $\phi_{n0}$ of the respective magnetic field detectors 25a to 25h (n being 8 in the instant embodiment) are added together, and the sum is divided by n to obtain an average value $\phi_0$. This calculation, namely $$\phi_0 = \frac{1}{n} \sum_{i=1}^{n} \phi_{i0}$$

is performed in a first stage I of the arithmetic circuit 28.

When a field intensity change $\Delta\phi$ is produced due to quenching occurred in one of the superconductive coils 22a to 22d, for instance in the coil 22a, an operation on $$(\Delta\phi)^2 = \sum_{i=1}^{n} (\phi_i - \phi_0)^2$$

is performed by a second stage II to obtain the intensity $\phi_i$ of magnetic field set up by each of the protective coils 23a to 23d for minimizing $(\Delta\phi)^2$, that is, the difference between $\phi_i$ and $\phi_0$ or the change from the magnetic field $\phi_0$ in the normal state of one $\phi_i$ at the time of quenching.

When $\phi_i$ is obtained, current $I_i$ to be caused through the protective coils 23a to 23d for producing this field is obtained by a third stage III, and the thyristor gate control or firing angle $\alpha_i$ which is necessary for causing the current $I_i$ is obtained by a fourth stage IV. The thyristor gate firing angle of the thyristor converter 27 is controlled to the control angle $\alpha_i$ which is obtained in the above way for causing the calculated current $I_i$ to flow through the protective coil 23a.

In the above way, with the occurrence of quenching in a superconductive coil, for instance, in the coil 22a, the current through the coil 22a is quickly reduced to remove quenching, while at the same time a current corresponding to the reduction of the quenching current is caused through the protective coils 23a to 23d so that the remaining sound superconductive coils 22b to 22d will not be influenced by the quenching in the coil 22a at all. That is, the superconductive coil 22a with quenching therein alone can be separated from the system with neither the possibility of propagation of the quenching produced in that coil to the other coils nor the possibility of adverse influence of an unbalance of the magnetic field on plasma that may otherwise be prone. After the quenching state is released, the superconductive coil 22a is excited again while attenuating the protective coil current, thus restoring the normal running state.

The operation described above is illustrated in FIG. 6. Upon occurrence of quenching in the superconductive coil 22a at an instant $t_1$, current in this coil is reduced from that instant as shown by a solid curve a by operating the thyristor converter 26 as an inverter. At the same time, the protective coil 23a is excited at the instant $t_1$ so that current through it rises as shown by a broken line b, thus compensating for the reduction of the magnetic field set up by the coil 22a with the field produced by the current b through the coil 23a to minimize the influence of the quenching upon the other sound superconductive coils 22b to 22d. After the removal of the quenching at an instant $t_3$, the current in the superconductive coil 22a is restored to the initial level while attenuating the current in the protective coil 23a from that instant, and the restoration of the system is completed at an instant $t_4$.

Figure 6:
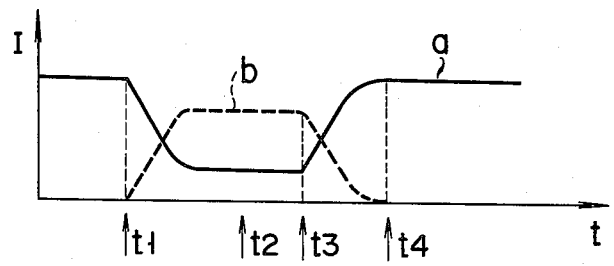
FIG. 6 is a time chart for illustrating the operation of the embodiment of FIG. 4.

While FIG. 6 shows the waveforms of current in the superconductive coil 22a with quenching taking place therein and current in the protective coil 23a only for the sake of simplicity of the drawing, actually, even with the occurrence of quenching in one of the superconductive coils in the embodiment of FIG. 4, for instance in coil 22a, all of the superconductive coils 22a to 22d and protective coils 23a to 23d are controlled in a ganged fashion for maintaining the steady operation of the apparatus and minimizing the adverse effects on plasma. More particularly, the thyristor converter 26 for the superconductive coil 22a with quenching taking place therein is immediately operated as an inverter for reducing the current in the superconductive coil 26, while the currents in the sound superconductive coils 22b to 22d and protective coils 23a to 23d are controlled in a ganged fashion such as to minimize $(\Delta\phi)^2=(\phi-\phi_0)^2$ where $\phi_0$ is the average flux density before the occurrence of quenching and $\phi$ is the flux density after the occurrence of quenching.

In this way, it is possible to maintain a state of magnetic field which is most desirous for plasma, and the inductance of the coil which is a load is very low when viewed from the thyristor as power source, so that the control voltage may be very low. This means that current can be quickly increased and reduced with low output voltage thyristor converters, and this is very economical.

Figure 7:
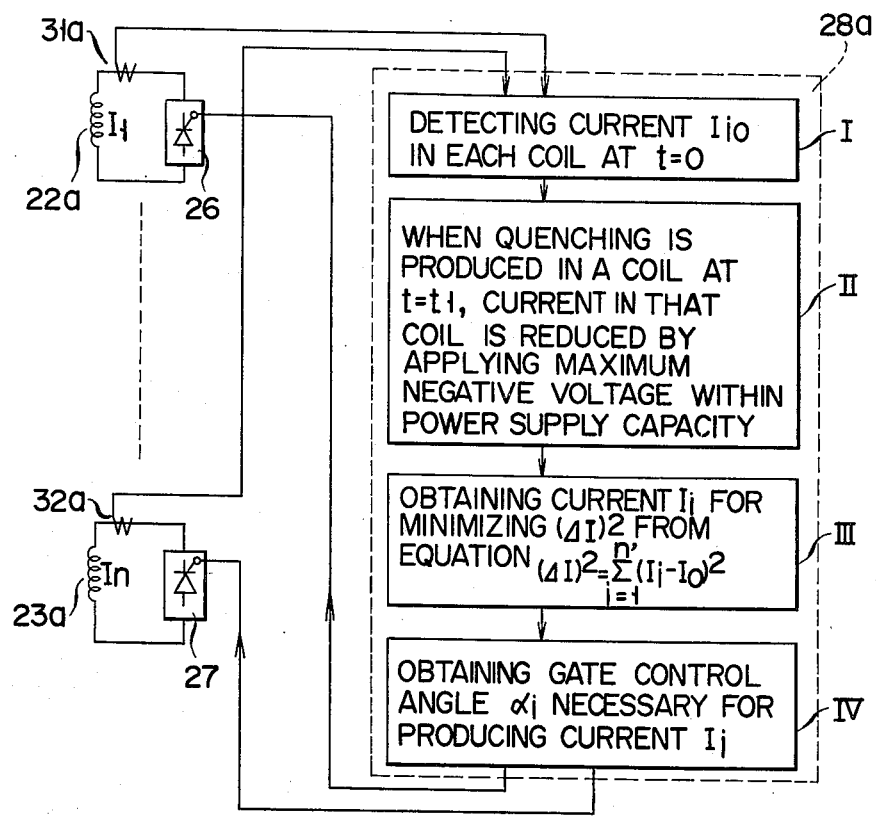
FIG. 7 is a flow chart for illustrating the construction and operation of an arithmetic circuit in another embodiment of the invention.

FIG. 7 shows another embodiment. Here, the path of current supplied from thyristor converter 26 to superconductive coil 22a is provided with a current transformer 31a for detecting current, and the path of current supplied from thyristor converter 27 to protective coil 23a is provided with a current transformer 32a for detecting current. In this case, an arithmetic circuit 28a performs a control such as to minimize $(\Delta I)^2 = \Sigma(I_i - I_{i0})^2$ where $I_{i0}$ is the current in each of the superconductive coils 22a to 22d before the occurrence of quenching and $I_i$ is the current after the occurrence of quenching. In this way, the most desirous state for the superconductive coils 22a to 22d can be maintained.

More particularly, in FIG. 7 current $I_{i0}$ in each of the superconductive coils 22a to 22d at $t=0$ is derived in a first operation stage I of the arithmetic circuit 28a. When quenching is produced in a superconductive coil, for instance in the coil 22a, at $t=t_1$, the current in that coil is reduced by applying the maximum negative voltage within the capacity of the power supply for that coil, as calculated in a second stage II.

Next, in a third stage III a current $I_i$ for minimizing $(\Delta I)^2$ is obtained from an equation, $$(\Delta I)^2 = \sum_{i=1}^{n'} (I_i - I_0)^2$$

where $I_0$ is the average current in the superconductive coils 22a to 22d in the normal state and $n'$ is the number of all coils, both superconductive and protective coils.

Then in a fourth stage IV a thyristor firing control angle $\alpha_i$, at which the current $I_i$ can be caused to flow through the individual coils 22a to 22d and 23a to 23d, is obtained, and the individual thyristor in the thyristor converters 26 and 27 are controlled according to the angle $\alpha_i$.

Figure 8:
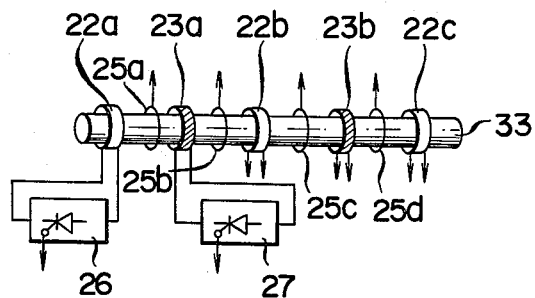
FIG. 8 is a schematic view showing part of a modification of the embodiment of FIG. 4.

While the embodiment of FIG. 4 has used the torus-shaped vacuum vessel for trapping plasma, it is also possible to use a straight cylindrical vacuum vessel 33 as shown in FIG. 8. In FIG. 8, like parts as those in the previous embodiment of FIG. 4 are designated by like reference numerals or symbols, and are not described any further.

As has been described in the foregoing, with the strong magnetic field generator comprising a plurality of superconductive coils according to the invention, which also comprises a plurality of protective coils and excitation thyristor converters for the superconductive and protective coils so that upon occurrence of quenching in some of the superconductive coils the currents in the superconductive and protective coils are controlled in a ganged fashion, it is possible to quickly effect removal of quenching in the superconductive coil with quenching therein and restoration to the normal state with low voltage thyristor converters and also minimize adverse effects upon the other sound superconductive coils and plasma. Thus, it is possible to provide a very economical, highly reliable and excellent strong magnetic field generator.

What is claimed is:

1. A strong magnetic field generator comprising a vacuum vessel, a plurality of superconductive coils wound on the outer periphery of said vacuum vessel, a plurality or protective coils wound on said outer periphery of said vacuum vessel similar to said superconductive coils, a control means functioning, upon occurrence of quenching in at least one of said superconductive coils, to quickly reduce current in said superconductive coil or coils with quenching taking place so as to remove the quenching while at the same time causing current corresponding to the reduction of current in said superconductive coil or coils with quenching therein to flow through said protective coils, and a current source for selectively supplying current to said plurality of superconductive and protective coils under the control of the control means.

2. A strong magnetic field generator according to claim 1, wherein said superconductive coils and protective coils are alternately wound on said vacuum vessel.

3. A strong magnetic field generator according to claim 1, wherein said control means includes a magnetic field detector means provided on the outer periphery of said vacuum vessel and an arithmetic circuit functioning in response to a change of the output of said magnetic field detector means such as to supply a current limiting signal to the gate of a thyristor converter or thyristor converters connected to said superconductive coil or coils with quenching therein while at the same time supplying gate signals to thyristor converters connected to said individual protective coils for causing current for compensating for said limitation of current in said superconductive coil or coils with quenching therein to flow through all said protective coils.

4. A method of operating a strong magnetic field generator, which comprises a vacuum vessel and superconductive coils and protective coils, these coils being wound on said vacuum vessel, in which method, upon occurrence of quenching in some of said superconductive coils, said quenching is removed while at the same time said protective coils are excited such as to minimize the change of the magnetic field within said vacuum vessel.

5. A method of operating a strong magnetic field generator according to claim 4, wherein said protective coils are excited such as to minimize the change in current through all said superconductive coils.

* * * * *